June 22, 1948. D. L. COSPER 2,443,676
MOTOR VEHICLE DOOR FRAME CONSTRUCTION
Filed June 13, 1945
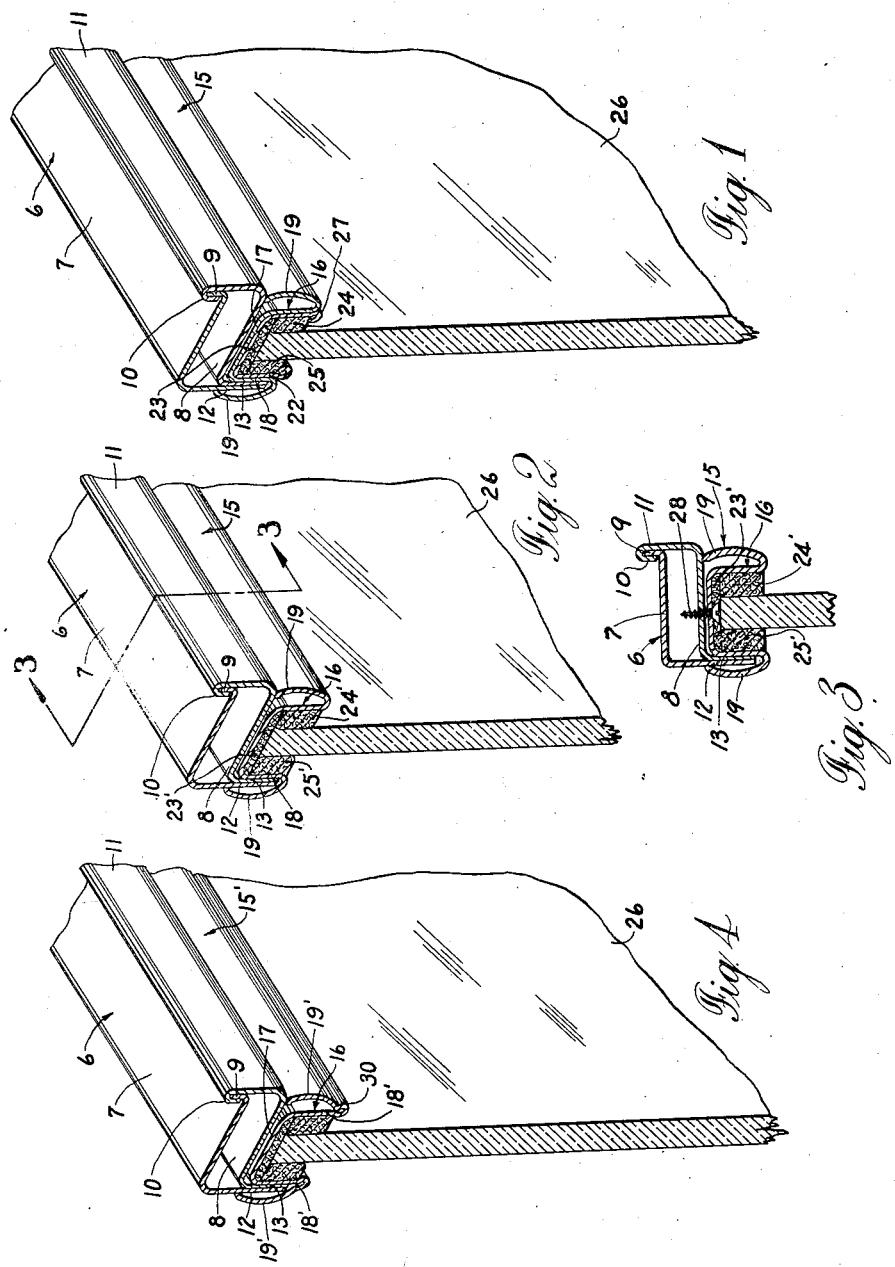
INVENTOR.
Dale L. Cosper
BY Brown, Jackson, Boettcher & Dienner
ATTORNEYS.

Patented June 22, 1948

2,443,676

UNITED STATES PATENT OFFICE 2,443,676

MOTOR VEHICLE DOOR FRAME CONSTRUCTION

Dale L. Cosper, Auburn, Ind., assignor to The Studebaker Corporation, South Bend, Ind., a corporation of Delaware Application June 13, 1945, Serial No. 599,142

2 Claims. (Cl. 296—44.5)

1

The present invention relates to an improvement in a door construction, and more particularly is concerned with a combination window run and garnish molding member for use with doors for automotive vehicles.

It has been the general practice in the past to provide in automobile door constructions a channel member serving as a window run for the glass panel of door. In many instances, for purposes of ornamentation garnish moldings have been also used to conceal the window run generally along the marginal edges of the window. These garnish moldings have been formed separate of the window run, and, in many instances, they are applied along the inside and outside marginal edges of the door. Thus in accordance with present practice three separate members are required if it is desired to produce the above described finished article, that is a window run member, and a garnish molding member for each side of the window run member. It will thus be observed that in many instances three separate parts must be fabricated, and three assembly operations required for this phase of the door construction which adds to the cost of the finished article.

It is an object of my invention to provide a single member incorporating both a window run and a garnish molding. A further object is to provide a window run with a garnish molding portion extending lengthwise along both sides of the window run, although, if desired, the garnish molding at either side of the window run may be omitted. A still further object is to provide a combined window run and garnish molding having universal application to automobile construction so that it may be applied to doors, for example, on either side of a motor vehicle. A still further object is to provide an article of the character described which may be readily assembled with a door.

Other objects and advantages of my invention will appear from the detail description.

Now, in order to acquaint those skilled in the art with the manner of utilizing and making devices in accordance with my invention, I shall describe in conjunction with the accompanying drawing certain preferred embodiments of my invention.

In the drawing;

Figure 1 is a sectional perspective view of a portion of a door construction illustrating one embodiment of my invention;

Figure 2 is a sectional perspective view of a portion of a door construction illustrating a modification of my invention;

Figure 3 is a detail vertical sectional view taken substantially on line 3—3 of Figure 2 looking in the direction indicated by the arrows; and Figure 4 is a sectional perspective view of a portion of a door construction illustrating a still further modification of my invention.

Referring now to Figure 1, I have chosen to illustrate my invention applied to a hollow header 6 forming a door frame member for a door, in which the header is formed by a pair of sheet metal members 7 and 8. In the door construction, as viewed in Figure 1, the surface normally disposed outwardly of the vehicle is at the right hand side with the left hand side of the figure being the inside surface of the door. The upper sheet metal member 7 is substantially of L-shape in cross-section one end 9 of which is bent to extend upwardly, and which end 9 is received between the inwardly directed flange 10 of the lower sheet member 8 and the exterior panel portion 11 of the inner sheet frame member 8. The opposite ends 12 and 13 of the sheet members 7 and 8, respectively, extend inwardly from one side edge of the door and are preferably welded to each other.

The combined window run and garnish molding of my invention is indicated generally by the reference numeral 15 and, preferably, is made from thin stainless steel sheet metal. It will be observed that it comprises an intermediate portion 16 of substantially U-shape in cross section to provide a channel extending parallel with the header 6. The U-shaped portion 16 of the combined window run and garnish molding member 15 comprises a base portion 17, the outer surface of which extends along the inner surface of the inner sheet 8 of the header 6, and two inwardly extending leg portions 18 substantially vertical to the base portion 17, and from which a pair of arcuate curved flanges 19 defining garnish molding portions with their free ends extending upwardly and outwardly of the door. The member 15 is thus formed of an integral piece of sheet metal to define the window run and the garnish moldings at both inner and outer surfaces of the door. It will be observed that the arcuate portion 19 at the inner surface of the door is spaced from the inner leg 18 of the U-shaped portion 16 defining the window to receive therebetween the flanges 12 and 13 of the frame members 7 and 8 defining the header 6.

It will be understood that the combined window run and garnish molding member 15 is suitably secured to the header 6 as by a plurality of screws 28, one of which is shown in Figure 3, extending through the base portion 17 of the U-shaped channel of the member 15 defining the window run and the inner sheet member 8. A second U-shaped member 22 is snugly received within the U-shape channel 16 of the combined window run and garnish molding member 15 into which are fitted three weather seal strips 23, 24 and 25 of suitable resilient material such as rabbit fur, with the strip 23 lying along the base of of the U-shaped member 22 and the strips 24 and 25 extending along the arm portions thereof, for snugly receiving the glass panel 26. The mechanism for sliding the panel 26 in the door is not shown, it being understood that conventional mechanism is provided for this purpose. The free end of the outer garnish molding flange 19 is caused to engage the inner marginal surface of the sheet member 8 of header 6 by tightening of the aforementioned screws for securing the combined window run and garnish molding member to the header so that a weather and dust tight seal is made between the free edge of the outer garnish molding and the header. It will be further observed that the free ends of the arms extending from the base of the substantially U-shaped channel member 22 are formed with beads 27 for strengthening and ornamental purposes, which may or may not be incorporated as desired.

In Figure 2 I have shown a modified form of construction of my invention, the header 6 herein being the same as that described in connection with the embodiment of Figure 1, and the like reference numerals indicate parts already described above. The distinction of this embodiment of my invention over that of Figure 1 resides in the elimination of the second U-shaped member 22 and provides a still more economical construction while yet obtaining the advantages of my invention in providing the combined window run and garnish molding member 15, as described in connection with Figure 1. However, in this form of the invention the three weather seal strips 23', 24' and 25' are assembled directly in the U-shaped portion 16 of the member 15. The arrangement of these members in the U-shaped portion 16 being the same as that described in connection with the arrangement of the similar parts in the U-shaped member 22 of the first described embodiment of my invention.

In Figure 3 it will be observed that the base portion of the U-shaped portion 16 of the member 15 lies closely adjacent the inside surface of the inner sheet member 8 of the header 6 and is secured to the door post by a screw 28 the head of which is embedded in the weather seal strip 23' so that it does not engage the edge of glass panel 26. It will be understood that generally a plurality of screws 28 are used in mounting the combined window run and garnish molding member 15 to the door post. By proportioning of the parts to effect this slight spacing of the base panel of the window run the weather and dust tight seal between the outer garnish flange and header 6 may be effected by tightening of screws 28.

In the embodiment of the invention shown in Figure 4, the header 6 is again of the same construction as previously described, and the like reference numerals indicate the same parts as described in connection with Figure 1. In this form of the invention the combined window run and garnish molding 15' is similar in most respects to that described in connection with Figures 1 and 2 except that in this instance there is a bead 30 between the inwardly extending arms 18' and the arcuate garnish molding flange 19', which extend from the bead 30 in the same manner as previously described. The embodiment of the invention shown in this figure thus simulates in appearance the construction of Figure 1 except that the bead is formed directly in the combined window run and garnish molding member 15' in lieu of providing the second U-shaped channel member 22 the inwardly extending legs of which are formed with the bead for attaining this ornamental appearance of the completed door construction.

It will be observed that in all forms of my invention the garnish molding is of a character in which it may be applied along the marginal edge of frame member of a door on either side of a car so that its application is universal to automobile door construction, and does not require special members for either side door of an automobile or the like. Also the garnish flanges 19 and 19' may be of any suitable length desired, for example, the length of outer flanges 19 and 19' could be lengthened so as to have the free ends thereof overlying all or part of the panels 11 of the inner sheet members 8 to achieve a modified ornamental appearance.

While I have shown what I consider to be the preferred embodiments of my invention, it will be understood that various modifications and rearrangements may be made therein without departing from the spirit and scope of my invention.

I claim:

1. In a door construction, a door frame member of substantially rectangular cross section having flange means extending inwardly of the inner surface thereof, an integral metal sheet having a portion of substantially U-shape in cross section defining a window run and comprising a base portion and a pair of leg portions extending substantially at right angles to said base portion, said base portion being adapted to be secured adjacent the inner marginal edge of said door frame member with the U-shaped portion extending lengthwise thereof, and flanges defining garnish moldings extending from the outer ends of said leg portions and overlying the same, said flange means of said door frame member lying between one of said leg portions and its associated flange.

2. In a door construction, a door frame member of substantially rectangular cross section having flange means extending inwardly of the inner surface thereof, an integral metal sheet having a portion of substantially U-shape in cross section defining a window run and comprising a base portion and a pair of leg portions extending substantially at right angles to said base portion, flanges defining garnish moldings extending from the outer ends of said leg portions and overlying the same, and means for mounting said metal sheet member on said door frame member with the U-shaped portion of the former extending lengthwise of the latter with the flange means of the door frame member lying between one of said leg portions and its associated flange, and with the free end of the other flange in engagement with the inner surface of said door frame member.

DALE L. COSPER.

REFERENCES CITED

The following references are of record in the file of this patent:

UNITED STATES PATENTS

| Number | Name | Date |
|---|---|---|
| 1,520,770 | Pollard | Dec. 30, 1924 |
| 1,751,746 | Morgana | Mar. 25, 1930 |
| 1,847,965 | Humer | Mar. 1, 1932 |
| 1,862,023 | Ledwinka | June 7, 1932 |
| 2,145,659 | Lane | Jan. 31, 1939 |
| 2,203,522 | Clark | June 4, 1940 |

FOREIGN PATENTS

| Number | Country | Date |
|---|---|---|
| 386,200 | Great Britain | Jan. 12, 1933 |